United States Patent
Pasupuleti

(10) Patent No.: US 10,459,780 B2
(45) Date of Patent: Oct. 29, 2019

(54) AUTOMATIC APPLICATION REPAIR BY NETWORK DEVICE AGENT

(71) Applicant: AppDynamics LLC, San Francisco, CA (US)

(72) Inventor: Srinivas Pasupuleti, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 11 days.

(21) Appl. No.: 15/582,665

(22) Filed: Apr. 29, 2017

(65) Prior Publication Data

US 2018/0314576 A1 Nov. 1, 2018

(51) Int. Cl.
| | |
|---|---|
| *G06F 11/00* | (2006.01) |
| *G06F 11/07* | (2006.01) |
| *H04L 29/08* | (2006.01) |
| *G06F 11/30* | (2006.01) |
| *H04L 12/24* | (2006.01) |

(52) U.S. Cl.
CPC ...... *G06F 11/0709* (2013.01); *G06F 11/3006* (2013.01); *H04L 41/00* (2013.01); *H04L 67/10* (2013.01); *H04L 67/12* (2013.01)

(58) Field of Classification Search
CPC .............. G06F 11/142; G06F 11/1423; G06F 11/1425; G06F 11/1428; G06F 11/20
USPC .......................................................... 714/4.2
See application file for complete search history.

(56) References Cited

U.S. PATENT DOCUMENTS

| | | | | |
|---|---|---|---|---|
| 7,809,811 B1* | 10/2010 | Rao | ........................ | G06F 15/173 |
| | | | | 709/221 |
| 2004/0153823 A1* | 8/2004 | Ansari | ................ | G06F 11/0715 |
| | | | | 714/38.14 |
| 2012/0166869 A1* | 6/2012 | Young | ................... | G06F 11/008 |
| | | | | 714/15 |
| 2016/0055045 A1* | 2/2016 | Souza | ................. | G06F 11/0712 |
| | | | | 714/57 |
| 2017/0171047 A1* | 6/2017 | Freishtat | ................. | H04L 43/08 |

\* cited by examiner

*Primary Examiner* — Sarai E Butler
(74) *Attorney, Agent, or Firm* — Behmke Innovation Group LLC; James Behmke; Stephen D. LeBarron

(57) ABSTRACT

In one aspect, a system for automatic application repair by a network device agent in a monitored environment includes a processor; a memory; and one or more modules stored in the memory and executable by a processor to perform operations including: capture network device application data for a monitored application, the network device performing a function other than computing, analyze the captured data to detect a performance issue, identify a remedy associated with training data that corresponds to the captured data, and automatically applying the remedy to the network device.

27 Claims, 7 Drawing Sheets

AUTOMATIC APPLICATION REPAIR BY NETWORK DEVICE AGENT

BACKGROUND

In pursuit of the highest level of service performance and user experience, companies around the world are engaging in digital transformation by enhancing investments in digital technology and information technology (IT) services. By leveraging the global system of interconnected computer networks afforded by the Internet and the World Wide Web, companies are able to provide ever increasing web services to their clients. The web services may be provided by a web application which uses multiple services and applications to handle a given transaction. The applications may be distributed over several interconnected machines, such as servers, making the topology of the machines that provide the service more difficult to track and monitor.

SUMMARY

Examples of implementations of an automatic application repairing network device agent are disclosed. Specifically, the disclosed technology for a network device agent that monitors a network device having a function separate from computation, detects performance issues in the network device, automatically identify a remedy based on the monitoring, and automatically applies the remedy to the network device.

In one aspect, a system for automatic application repair by a network device agent in a monitored environment is disclosed. The system includes a processor; a memory; and one or more modules stored in the memory and executable by a processor to perform operations. The operations include: capture network device application data for a monitored application, the network device performing a function other than computing, analyze the captured data to detect a performance issue, identify a remedy associated with training data that corresponds to the captured data, and automatically applying the remedy to the network device.

The system can be implemented in various ways to include one or more of the following features. The one or more modules can be executable to perform operations including: analyzing application data to determine an application performance anomaly. The one or more modules can be executable to perform operations including: analyzing network device functionality to determine a functional performance anomaly. The one or more modules can be executable to perform operations including: disabling a portion of the network device functionality. The one or more modules can be executable to perform operations including: adding the captured data and the automatically applied remedy to the training data for the network device.

In another aspect, a method for automatic application repair by a network device agent in a monitored environment is disclosed. The method includes: capturing network device application data for a monitored application by an agent on the network device, the network device performing a function other than computing, detecting an anomaly based the captured application data, in response to detecting the anomaly, identifying by the agent a remedy associated with training data that corresponds to the captured application data, and automatically applying by the agent the remedy to the network device.

The method can be implemented in various ways to include one or more of the following features. The method can include analyzing application data to determine an application performance anomaly. The method can include analyzing network device functionality to determine a functional performance anomaly. The method can include adding the captured data and the automatically applied remedy to the training data for the network device.

In yet another aspect, a non-transitory computer readable medium embodying instructions when executed by a processor to cause operations to be performed for automatic application repair by a network device agent in a monitored environment is disclosed. The operations include: capturing network device application data for a monitored application by an agent on the network device, the network device performing a function other than computing, detecting an anomaly based the captured application data, in response to detecting the anomaly, identifying by the agent a remedy corresponding to the captured application data, and automatically applying by the agent the remedy to the network device.

The non-transitory computer readable medium can be implemented in various ways to include one or more of the following features. The operation can include analyzing application data to determine an application performance anomaly. The operation can include analyzing network device functionality to determine a functional performance anomaly. The operation can include adding the captured data and the automatically applied remedy to the training data for the network device

DETAILED DESCRIPTION

Figure 1:
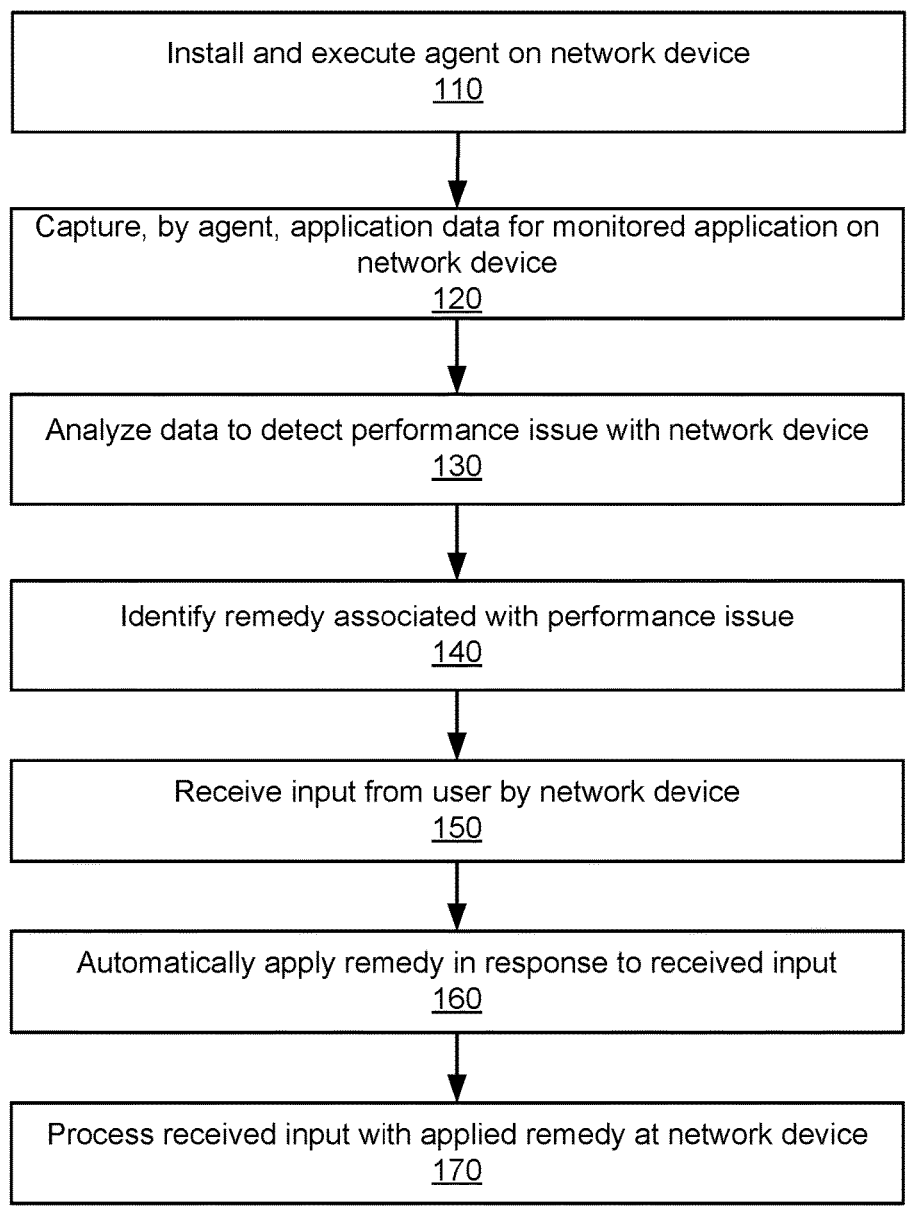
FIGS. 1-5 are process flow diagrams of exemplar processes for automatic application repair by a network device.

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

To maintain the highest level of service performance and end user experience, each web application can be monitored to provide insight into information that can negatively affect the overall performance of the web application, which can cause negative end user experience. The web applications can be monitored on client machines, backend servers, and network devices that have a function that is separate from computation such as smart appliances, parking meters, and point of sale systems. When an anomaly or error occurs, the network devices may be automatically repaired based on training data including input and output parameters for the same or similar anomalies or errors and associated with one or more remedies to be applied to the network device.

Automatic Application Repair by a Network Device Overview

The technology disclosed in this patent document provides for dynamic and efficient application intelligence platforms, systems, devices, methods, and computer readable media including non-transitory type that embody instructions for causing a machine including a processor to perform various operations disclosed in this patent document to perform Automatic application repair by a network device The disclosed technology provides the automatic application repair by a network device agent so that the network device, when there is a performance or function anomaly or error, may continue to operate in limited capability until a permanent software patch or other repair can be made to software or hardware that is the root cause of the performance or function anomaly or error.

The network device subject to automatic repair can communicate with other devices wirelessly. The wireless communication may be via a Wi-Fi signal, a BLUETOOTH radio frequency signal for communication with local devices, and wireless signals that may communicate via an IP based network. In some instances, a network device has a function that is separate from computation, such as for example a light, refrigerating perishable goods, securing a home, managing parking fees for a parking space, or some other function. The network device itself may be implemented as a smart appliance (e.g., smart light or smart refrigerator), home automation gateway, parking meter, point of sale device, automotive infotainment dashboard, farm tractor, or other device. Typically, such a network device has less processing power, memory, and bandwidth that other computing devices, such as for example laptop computers, tablet computers, smart phones, and other mobile devices, as well as other machines typically used for computing purposes. As such, typical monitoring processes applied to other computing devices with more powerful resources can negatively affect the performance of the network device more than other computer devices.

Automatic application repair is performed by an agent installed on the network device. The agent monitors and application, analyzes data associated with the application and the network device itself, detects an error or anomaly. The agent may then compare past anomaly and/or error data and corresponding input data and output data (collectively referred to as "training data") that correlates to the presently detected error or anomaly, identify a remedy associated with the training data that matches or is the closest match to the captured data, and apply the remedy to the network device to correct, bypass or otherwise overcome the error or anomaly. The remedy may include an operation or modification that is automatically applied to the network device, such as a device reset or disabling a portion of the network device functionality. The remedy may also include information such as a suggestion which is transmitted to an administrator.

Automatic Application Repair by a Network Device Process

FIGS. 1-5 are process flow diagrams of exemplar processes 100, 102, 104, 106, and 108 for automatic application repair by a network device agent. As discussed further with respect to FIGS. 6-8, performance issues with a monitored environment are detected by monitoring applications and entities, such as transactions, tiers, nodes, and machines in the monitored environment using agents installed at individual machines at the entities. For example, each node can include one or more machines or network devices that perform part of the applications. The agents collect data associated with the applications of interest and associated nodes, machines, and network devices where the applications are being operated. Examples of the collected data include performance data, such as metrics, metadata, and topology data that indicate relationship information.

In the exemplary process 100 of FIG. 1, agents may be installed and executed on a network device at step 110. The agents may be installed wirelessly, for example over a Wi-Fi network, via a BLUETOOTH network, or in some other manner. An agent may capture application data for an application monitored by the agent on the network device at step 120. The captured data may be analyzed to detect a performance issue with the network device at step 130. In some instances, detecting a performance issue may include detecting an application performance anomaly or error. In some instances, detecting a performance issue may include detecting an anomaly or error in the non-computing function of the network device. After analyzing data to detect an issue, a remedy associated with the performance issue may be identified at step 140. Associating a remedy with the performance issue may include retrieving training data, comparing the training data to the captured data, and identifying a remedy associated with a portion of the training data that matches the captured data.

Input can be received from a user by a network device at step 150. The input may depend on the type of network device. For example, for a parking meter the input may include receiving a credit card into a credit card reader. In another example, for an intelligent thermostat device, the input may include receiving a temperature setting at which an air-conditioning unit should turn on.

A remedy is automatically applied to the network device at step 160. In some instances, a remedy is automatically applied in response to receiving input at step 150 such that the input initiates the application of the remedy to the device. In some instances, the remedy is automatically applied to the network device as soon as the remedy is identified at step 140. In this case, automatically applying the remedy would occur before input is received by a user on the network device and immediately after the remedy is identified (not illustrated in FIG. 1).

The received input is processed by the network device in which the remedy has been applied at step 170. Processing the input once the remedy has been applied provides a different user experience than if the remedy had not applied. For example, if in a parking meter error occurs whenever a VISA card payment card is received, the remedy may be to provide a message to a user that VISA card payments are currently not accepted. Examples of providing a remedy to a network device are discussed below.

Figure 2:
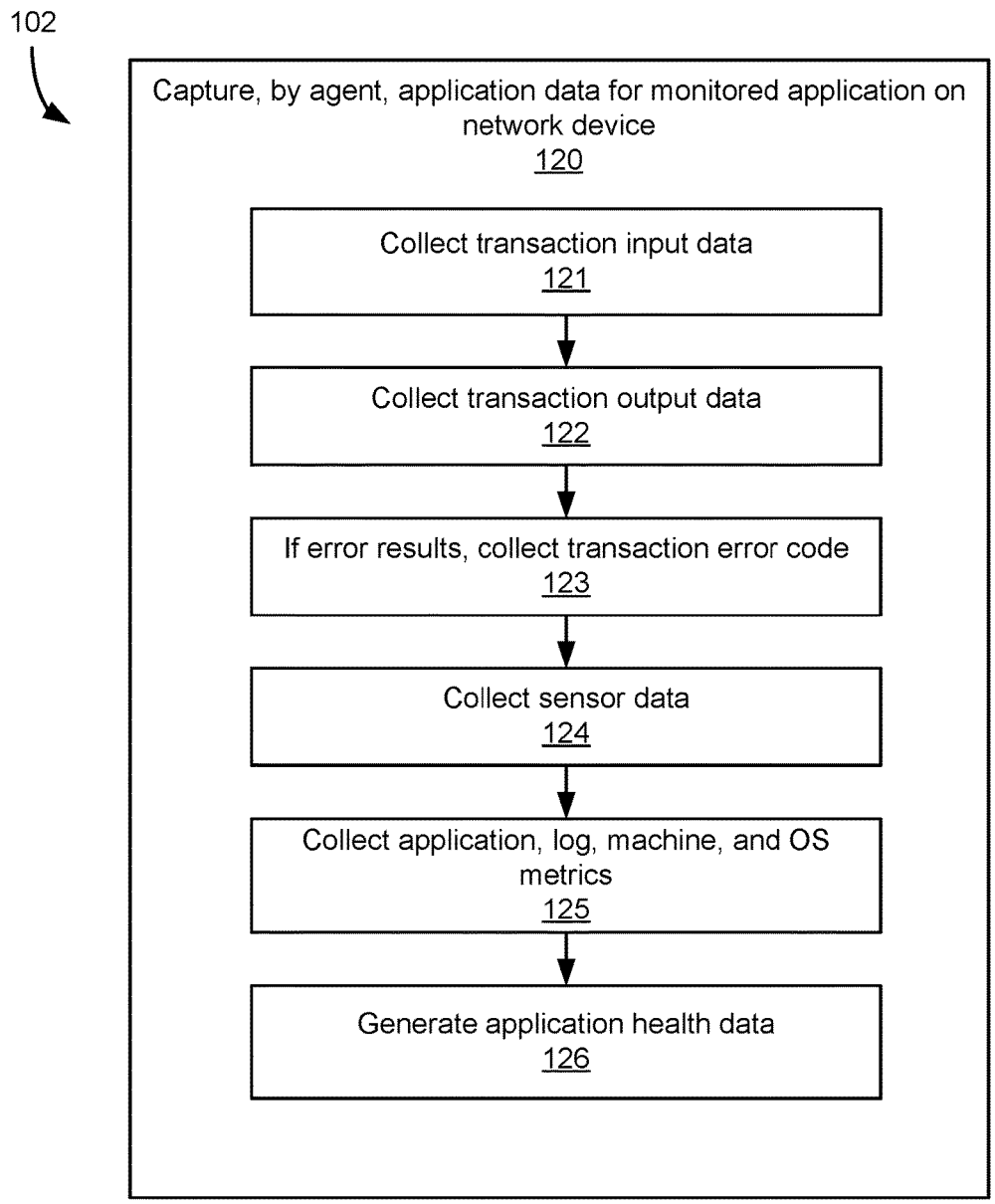

Capturing application data for a monitored application on a network device can include additional features as illustrated in the exemplary process 102 of FIG. 2. For example, transaction input data is collected by an agent on a network device at step 121. The input data may include one or more parameters that are received from a user, sensors, a network, or some other source. Transaction output data is then collected by the agent on the network device at step 122. The output data may include the result of a transaction, information displayed to a user, and other output provided by the network device. If an error results in the current transaction, the transaction error code is collected by the agent on the network device at step 123. The error code may be an identifier, a name of an error method for flag, or some other information or data for identifying an error that resulted from the transaction. Sensor data may be collected by the agent on the network device at step 124. The sensor data may include the state of the sensor and data collected by the sensor. Application, log, machine, an operating system metrics may be collected by the agent on the network device at step 125. Application health data may be generated at step 126. The application health data may be generated by the agent on the network device from all or a portion of the data received in steps 121-125. For example, health data may include a time to respond to a user input or a sensor event and be generated based on the collected application data.

Figure 3:
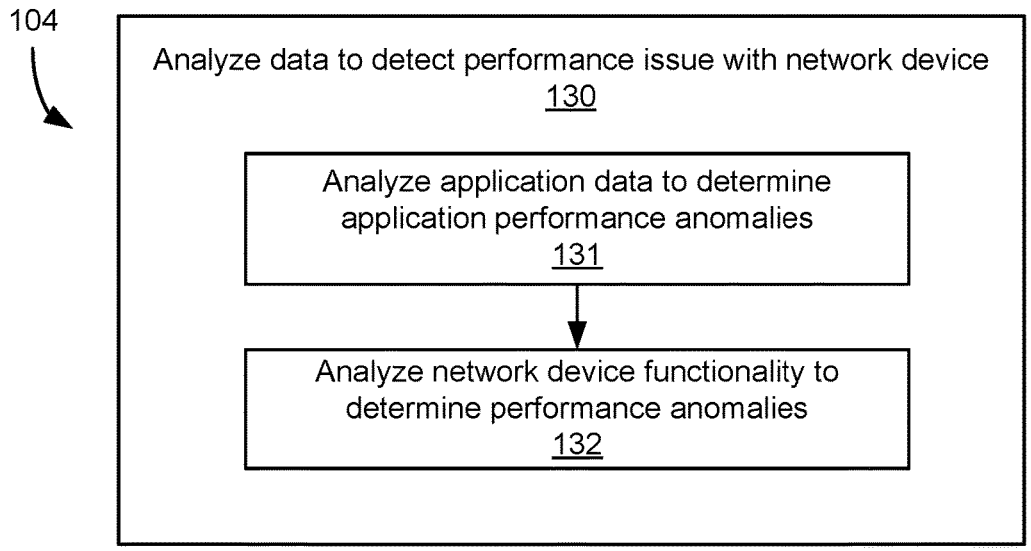

Analyzing data to detect performance issues within a network device can include additional features as illustrated in the exemplary process 104 of FIG. 3. For example, application data may be analyzed to determine application performance anomalies at step 131. An example of an application performance anomaly includes a method that hangs or takes three times as long to complete execution as compared to the average time for the method to complete. Network device functionality may be analyzed to determine performance anomalies at step 132. The performance anomaly in the functionality of a network device may include a failure of the device to perform a function other than a computing function, such as for example the failure of a smart thermostat to accept a minimum temperature at which to turn a heating unit on.

Figure 4:
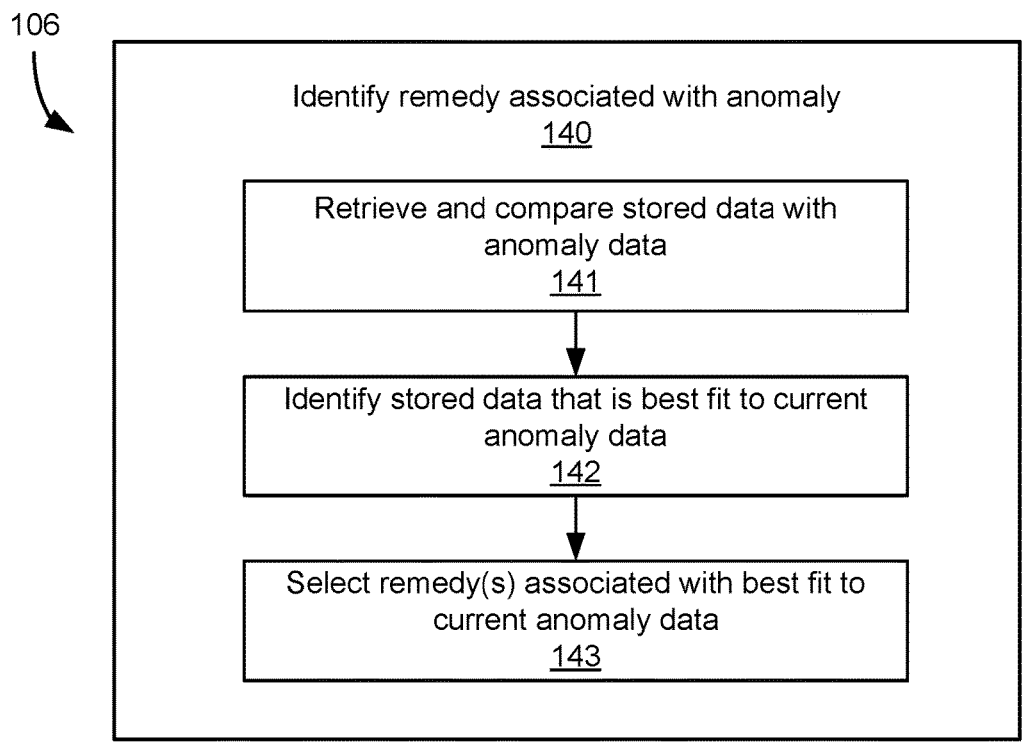

Identifying a remedy associated with an anomaly can include additional features as illustrated in exemplary process 106 of FIG. 4. In some instances, a remedy may be determined by a model which uses training data that includes both input and output. The model can be specific to the local device application and can consist of a machine learning algorithm such as for example k nearest neighbor (kNN), reinforcement learning, regression, neural networks, and support vector machines.

Stored training data may be retrieved and compared with anomaly data at step 141. The anomaly data identified by the agent may be compared with the training data associated with previous anomalies. The two data sets may be compared to determine if data sets for each anomaly match within a certain threshold, such as for example a 50%, 75%, or 100% match between the data sets. The set of training data inputs and outputs that best fits the current anomaly data set input and outputs is identified at step 142. A remedy associated with the identified training data is selected at step 143. In some instances, each stored set of training data can be associated with one or more remedies. Those associated remedies are selected at step 143 to be applied to the network device.

Figure 5:
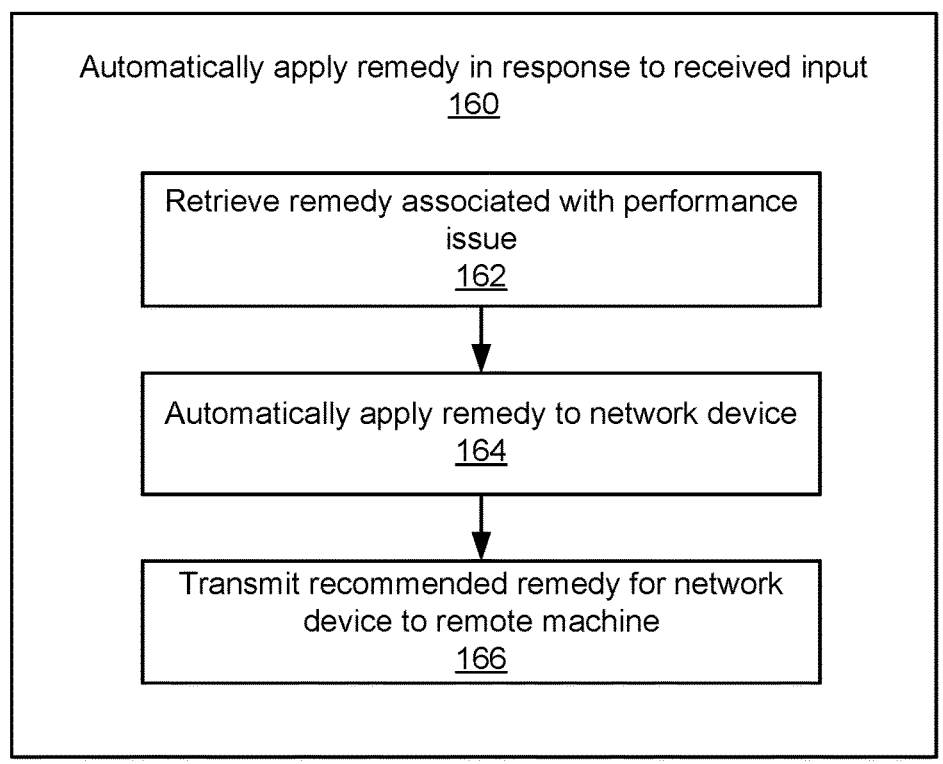

Automatically applying a remedy in response to the received input can include additional features as illustrated in exemplary process 108 of FIG. 5. For example, a remedy associated with the performance issue may be retrieved at step 162. The remedy may be automatically applied to the network device at step 164. Automatically applying the remedy may include disabling an input that causes the error or anomaly and displaying an indication to a user that a particular input is not currently available, deactivating a portion of the functionality of a network device associated with the anomaly or error, or applying some other remedy. Examples of automatically applying a remedy are discussed in more detail below. A recommendation for a remedy for network device may be transmitted to a remote machine at step 166. In some instances, recommendations for a remedy may be transmitted to an administrator via the remote machine to allow the administrator the choice of whether or not to apply remedy to the network device.

Automatic Application Repair by a Network Device Examples

Examples of automatically repairing an application by an agent within a network device are discussed below. The examples are not intended to be limiting, but are merely provided for discussion purposes and to illustrate exemplary implementations of the present technology.

In an example, a parking meter network device or point-of-sale network device may make network calls. Each network call may have a set of input data including user ID, parking space, card type, and type of parking (long, short). The output of a process payment network call may be that the payment is accepted or the payment fails. Hence, the training data for this network device type may include an input and output. The input may include a URL, user ID, parking space, card type, issue think, type of parking, and time of day. The output may include an indication that the payment was successful or at the payment was denied and provide an error code. If the output is a failure with an error code, then the agent will find matches between the input that produced the failing output and all the training input for which the payment failed with the same error code. The agent then accesses remedies associated with the training input with the same error code and can apply one or more of the remedies to the current network device. Remedies may include an immediate retry, changing a network request parameter such as parking type, parking space, or card type, or some other remedy. Each set of captured input and output data and any corresponding remedy applied is added to the training set to develop reinforcement learning. Every remedy and problem detected can be reported to a controller. In response, a backend can send a control signal such as trying to remedy, overwrite, or disable the current remedy action, which can be implemented in place of or in parallel with a remedy automatically applied by an agent.

In another example, a mobile application may include training data of an input and an output. The input may include a search keyword, category such as man or woman, collections such as winter or summer, clothing type such as jeans, formal, T-shirt, and so on, and size such as small, medium, or large. The outputs may include results available, time to deliver results, and error code. The test data may include a new user input for search. If an output is a failure with an error code, then a commonality is found between the test input (i.e., captured input and output data) and the training data set having matching input data the same error code. For the training data matches, the corresponding remedies may be retrieved which are used to resolve the error code, such as an immediate retry, changing a network request parameter, a reset, or other remedy. If no matching training data results are available, the input query may be matched to the last successful query in the training data with almost the same input parameters. This may be achieved, for example, by changing one input parameter at a time and determine if there is a matching successful query.

In yet another example, an application may have a user interface and include an input training data and output training data. The input may include a sequence of user interface screens and actions. The output may include captured state information when a user interface hangs and a user manual restart of the application. The test data may include an input of a sequence of user interface screens and actions. In some instances, before each action is performed, the possibility of a user interface hang is determined to be imminent if the action was likely to result in a user interface hang according to the training data. If likelihood may be more than a certain threshold, such as above 80% or 90%, then a remedy may involve communicating a suggestion to the user that the action is temporarily disabled. The agent on the network device may also communicate to a controller that the functionality is disabled with screenshots and user data for a potential remedy. Functionality may be re-enabled if requested from the backend, upon restart, or after a timer expires.

In yet another example, an automated infotainment system may include input consisting of device context at the time of a crash, which application is used, whether Bluetooth is paired, a Bluetooth device that is paired, music player status, and so on. In the case of a user interface crash, the device context may be mapped to previous crashes stored with the same signature to find common parameters. A root cause of the crash may be determined, such as the device crashes whenever the system is paired to a specific smart phone. The remedy applied by the agent may result in a display to a user that the system is having problems pairing a specific phone, informing the controller of the crash, and reporting to the car company providing the infotainment system.

In yet another example, a home sensor, automotive sensor, or industry sensor may have sensor readings that are abnormal, invalid or out of bounds. When the abnormality occurs, the device and application context may be captured. Application context may include data such as memory usage, CPU usage, time of data, system alarms, number of active processes, and so on. The device and application context may be compared when an expected or baseline sensor reading was seen and the difference may be checked. If such readings were seen before, the remedies associated with the readings may be retrieved and applied to the particular sensor (i.e., network device).

Application Intelligence Platform Architecture

Figure 6:
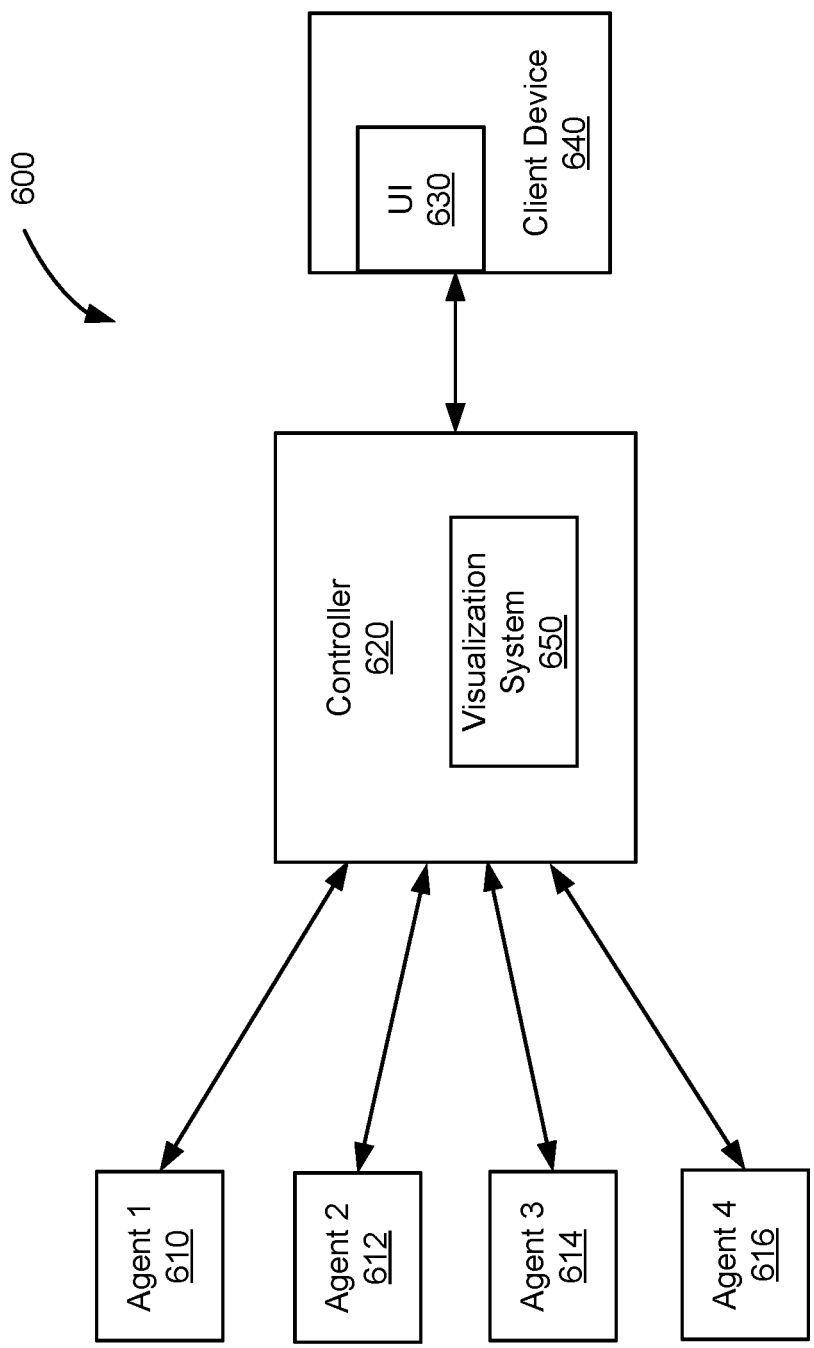
FIG. 6 is a block diagram of an exemplary application intelligence platform that provides for automatic application repair by a network device as disclosed in this patent document, including the processes disclosed with respect to FIGS. 1-5.

FIG. 6 is a block diagram of an exemplary application intelligence platform 600 that can implement automatic application repair by a network device agent in a monitored environment as disclosed in this patent document. The application intelligence platform is a system that monitors and collect metrics of performance data for an application environment being monitored. At the simplest structure, the application intelligence platform includes one or more agents 610, 612, 614, 616 and one or more controllers 620. While FIG. 6 shows four agents communicatively linked to a single controller, the total number of agents and controller can vary based on a number of factors including the number of applications monitored, how distributed the application environment is, the level of monitoring desired, the level of user experience desired, etc.

Controllers and Agents

The controller 620 is the central processing and administration server for the application intelligence platform. The controller 320 serves a browser-based user interface (UI) 630 that is the primary interface for monitoring, analyzing, and troubleshooting the monitored environment. The controller 620 can control and manage monitoring of business transactions distributed over application servers. Specifically, the controller 620 can receive runtime data from agents 610, 612, 614, 616 and coordinators, associate portions of business transaction data, communicate with agents to configure collection of runtime data, and provide performance data and reporting through the interface 630. The interface 630 may be viewed as a web-based interface viewable by a client device 640. In some implementations, a client device 640 can directly communicate with controller 620 to view an interface for monitoring data.

In the Software as a Service (SaaS) implementation, a controller instance 620 is hosted remotely by a provider of the application intelligence platform 600. In the on-premise (On-Prem) implementation, a controller instance 620 is installed locally and self-administered.

The controllers 620 receive data from different agents 610, 612, 614, 616 deployed to monitor applications, databases and database servers, servers, and end user clients for the monitored environment. Any of the agents 610, 612, 614, 616 can be implemented as different types of agents specific monitoring duties. For example, application agents are installed on each server that hosts applications to be monitored. Instrumenting an agent adds an application agent into the runtime process of the application.

Database agents are software (e.g., Java program) installed on a machine that has network access to the monitored databases and the controller. Database agents queries the databases monitored to collect metrics and passes the metrics for display in the metric browser—database monitoring and in the databases pages of the controller UI. Multiple database agents can report to the same controller. Additional database agents can be implemented as backup database agents to take over for the primary database agents during a failure or planned machine downtime. The additional database agents can run on the same machine as the primary agents or on different machines. A database agent can be deployed in each distinct network of the monitored environment. Multiple database agents can run under different user accounts on the same machine.

Standalone machine agents are standalone programs (e.g., standalone Java program) that collect hardware-related performance statistics from the servers in the monitored environment. The standalone machine agents can be deployed on machines that host application servers, database servers, messaging servers, Web servers, etc. A standalone machine agent has an extensible architecture.

End user monitoring (EUM) is performed using browser agents and mobile agents to provide performance information from the point of view of the client, such as a web browser or a mobile native application. Browser agents and mobile agents are unlike other monitoring through application agents, database agents, and standalone machine agents that being on the server. Through EUM, web use (e.g., by real users or synthetic agents), mobile use, or any combination can be monitored depending on the monitoring needs. Browser agents (e.g., agents 610, 612, 614, 616) can include Reporters that report monitored data to the controller.

Browser agents are small files using web-based technologies, such as JavaScript agents injected into each instrumented web page, as close to the top as possible, as the web page is served and collects data. Once the web page has completed loading, the collected data is bundled into a beacon and sent to the EUM cloud for processing and ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases.

A mobile agent is a small piece of highly performant code that gets added to the source of the mobile application. Mobile RUM provides information on the native iOS or Android mobile application as the end users actually use the mobile application. Mobile RUM provides visibility into the functioning of the mobile application itself and the mobile application's interaction with the network used and any server-side applications the mobile application communicates with.

The controller 620 can include a visualization system 650 for displaying the reports generated by the Reporters at the browser agents as disclosed in this patent document. In some implementations, the visualization system 650 can be implemented in a separate machine (e.g., a server) different from the one hosting the controller 620.

Application Intelligence Monitoring

The disclosed technology can provide application intelligence data by monitoring an application environment that includes various services such as web applications served from an application server (e.g., Java virtual machine (JVM), Internet Information Services (IIS), Hypertext Preprocessor (PHP) Web server, etc.), databases or other data stores, and remote services such as message queues and caches. The services in the application environment can interact in various ways to provide a set of cohesive user interactions with the application, such as a set of user services applicable to end user customers.

Application Intelligence Modeling

Entities in the application environment (such as the JBoss service, MQSeries modules, and databases) and the services provided by the entities (such as a login transaction, service or product search, or purchase transaction) are mapped to an application intelligence model. In the application intelligence model, a business transaction represents a particular service provided by the monitored environment. For example, in an e-commerce application, particular real-world services can include user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

Business Transactions

A business transaction representation of the particular service provided by the monitored environment provides a view on performance data in the context of the various tiers that participate in processing a particular request. A business transaction represents the end-to-end processing path used to fulfill a service request in the monitored environment. Thus, a business environment is a type of user-initiated action in the monitored environment defined by an entry point and a processing path across application servers, databases, and potentially many other infrastructure components. Each instance of a business transaction is an execution of that transaction in response to a particular user request. A business transaction can be created by detecting incoming requests at an entry point and tracking the activity associated with request at the originating tier and across distributed components in the application environment. A flow map can be generated for a business transaction that shows the touch points for the business transaction in the application environment.

Performance monitoring can be oriented by business transaction to focus on the performance of the services in the application environment from the perspective of end users. Performance monitoring based on business transaction can provide information on whether a service is available (e.g., users can log in, check out, or view their data), response times for users, and the cause of problems when the problems occur.

Business Applications

A business application is the top-level container in the application intelligence model. A business application contains a set of related services and business transactions. In some implementations, a single business application may be needed to model the environment. In some implementations, the application intelligence model of the application environment can be divided into several business applications. Business applications can be organized differently based on the specifics of the application environment. One consideration is to organize the business applications in a way that reflects work teams in a particular organization, since role-based access controls in the Controller UI are oriented by business application.

Nodes

A node in the application intelligence model corresponds to a monitored server or JVM in the application environment. A node is the smallest unit of the modeled environment. In general, a node corresponds to an individual application server, JVM, or CLR on which a monitoring Agent is installed. Each node identifies itself in the application intelligence model. The Agent installed at the node is configured to specify the name of the node, tier, and business application under which the Agent reports data to the Controller.

Tiers

Business applications contain tiers, the unit in the application intelligence model that includes one or more nodes. Each node represents an instrumented service (such as a web application). While a node can be a distinct application in the application environment, in the application intelligence model, a node is a member of a tier, which, along with possibly many other tiers, make up the overall logical business application.

Tiers can be organized in the application intelligence model depending on a mental model of the monitored application environment. For example, identical nodes can be grouped into a single tier (such as a cluster of redundant servers). In some implementations, any set of nodes, identical or not, can be grouped for the purpose of treating certain performance metrics as a unit into a single tier.

The traffic in a business application flows among tiers and can be visualized in a flow map using lines among tiers. In addition, the lines indicating the traffic flows among tiers can be annotated with performance metrics. In the application intelligence model, there may not be any interaction among nodes within a single tier. Also, in some implementations, an application agent node cannot belong to more than one tier. Similarly, a machine agent cannot belong to more than one tier. However, more than one machine agent can be installed on a machine.

Backend System

A backend is a component that participates in the processing of a business transaction instance. A backend is not instrumented by an agent. A backend may be a web server, database, message queue, or other type of service. The agent recognizes calls to these backend services from instrumented code (called exit calls). When a service is not instrumented and cannot continue the transaction context of the call, the agent determines that the service is a backend component. The agent picks up the transaction context at the response at the backend and continues to follow the context of the transaction from there.

Performance information is available for the backend call. For detailed transaction analysis for the leg of a transaction processed by the backend, the database, web service, or other application need to be instrumented.

Baselines and Thresholds

The application intelligence platform uses both self-learned baselines and configurable thresholds to help identify application issues. A complex distributed application has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed application intelligence platform can perform anomaly detection based on dynamic baselines or thresholds.

The disclosed application intelligence platform automatically calculates dynamic baselines for the monitored metrics, defining what is "normal" for each metric based on actual usage. The application intelligence platform uses these baselines to identify subsequent metrics whose values fall out of this normal range. Static thresholds that are tedious to set up and, in rapidly changing application environments, error-prone, are no longer needed.

The disclosed application intelligence platform can use configurable thresholds to maintain service level agreements (SLAs) and ensure optimum performance levels for system by detecting slow, very slow, and stalled transactions. Configurable thresholds provide a flexible way to associate the right business context with a slow request to isolate the root cause, Health Rules, Policies, and Actions In addition, health rules can be set up with conditions that use the dynamically generated baselines to trigger alerts or initiate other types of remedial actions when performance problems are occurring or may be about to occur.

For example, dynamic baselines can be used to automatically establish what is considered normal behavior for a particular application, Policies and health rules can be used against baselines or other health indicators for a particular application to detect and troubleshoot problems before users are affected. Health rules can be used to define metric conditions to monitor, such as when the "average response time is four times slower than the baseline". The health rules can be created and modified based on the monitored application environment.

Examples of health rules for testing business transaction performance can include business transaction response time and business transaction error rate. For example, health rule that tests whether the business transaction response time is much higher than normal can define a critical condition as the combination of an average response time greater than the default baseline by 3 standard deviations and a load greater than 50 calls per minute. In some implementations, this health rule can define a warning condition as the combination of an average response time greater than the default baseline by 2 standard deviations and a load greater than 100 calls per minute. In some implementations, the health rule that tests whether the business transaction error rate is much higher than normal can define a critical condition as the combination of an error rate greater than the default baseline by 3 standard deviations and an error rate greater than 10 errors per minute and a load greater than 50 calls per minute. In some implementations, this health rule can define a warning condition as the combination of an error rate greater than the default baseline by 2 standard deviations and an error rate greater than 5 errors per minute and a load greater than 50 calls per minute. These are non-exhaustive and non-limiting examples of health rules and other health rules can be defined as desired by the user.

Policies can be configured to trigger actions when a health rule is violated or when any event occurs. Triggered actions can include notifications, diagnostic actions, auto-scaling capacity, running remediation scripts.

Metrics

Most of the metrics relate to the overall performance of the application or business transaction load, average response time, error rate, etc. or of the application server infrastructure (e.g., percentage CPU busy, percentage of memory used, etc.). The Metric Browser in the controller UI can be used to view all of the metrics that the agents report to the controller.

In addition, special metrics called information points can be created to report on how a given business (as opposed to a given application) is performing. For example, the performance of the total revenue for a certain product or set of products can be monitored. Also, information points can be used to report on how a given code is performing, for example how many times a specific method is called and how long it is taking to execute. Moreover, extensions that use the machine agent can be created to report user defined custom metrics. These custom metrics are base-lined and reported in the controller, just like the built-in metrics.

All metrics can be accessed programmatically using a Representational State Transfer (REST) API that returns either the JavaScript Object Notation (JSON) or the extensible Markup Language (XML) format. Also, the REST API can be used to query and manipulate the application environment.

Snapshots

Snapshots provide a detailed picture of a given application at a certain point in time. Snapshots usually include call graphs that allow that enables drilling down to the line of code that may be causing performance problems. The most common snapshots are transaction snapshots.

Exemplary Implementation of Application Intelligence Platform

Figure 7:
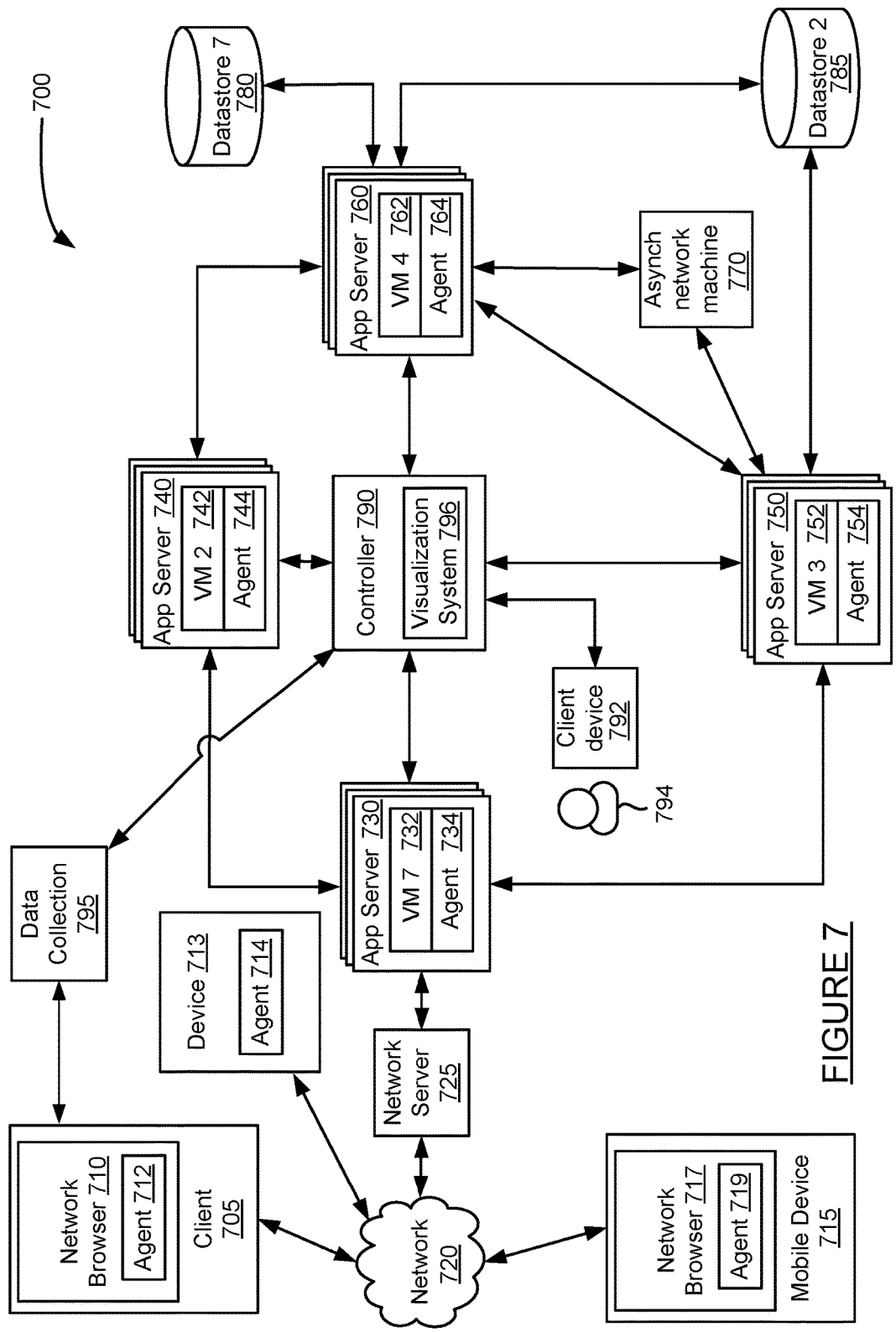
FIG. 7 is a block diagram of an exemplary system for automatic application repair by a network device as disclosed in this patent document, including the processes disclosed with respect to FIGS. 1-5.

FIG. 7 is a block diagram of an exemplary system 400 for automatic application repair by a network device agent in a monitored environment as disclosed in this patent document, including the processes disclosed with respect to FIGS. 1-5. The system 700 in FIG. 7 includes client device 705 and 792, mobile device 715, network 720, network server 725, application servers 730, 740, 750 and 760, asynchronous network machine 770, data stores 780 and 785, controller 790, and data collection server 795. The controller 790 can include visualization system 796 for providing displaying of the report generated by the Reporters at the browser agents as disclosed in this patent document. In some implementations, the visualization system 796 can be implemented in a separate machine (e.g., a server) different from the one hosting the controller 790.

Client device 705 may include network browser 710 and be implemented as a computing device, such as for example a laptop, desktop, workstation, or some other computing device. Network browser 710 may be a client application for viewing content provided by an application server, such as application server 730 via network server 725 over network 720.

Network browser 710 may include agent 712. Agent 712 may be installed on network browser 710 and/or client 705 as a network browser add-on, downloading the application to the server, or in some other manner. Agent 712 may be executed to monitor network browser 710, the operating system of client 705, and any other application, API, or another component of client 705. Agent 712 may determine network browser navigation timing metrics, access browser cookies, monitor code, and transmit data to data collection 760, controller 790, or another device. Agent 712 may perform other operations related to monitoring a request or a network at client 705 as discussed herein including report generating.

Mobile device 715 is connected to network 720 and may be implemented as a portable device suitable for sending and receiving content over a network, such as for example a mobile phone, smart phone, tablet computer, or other portable device. Both client device 705 and mobile device 715 may include hardware and/or software configured to access a web service provided by network server 725.

Mobile device 715 may include network browser 717 and an agent 719. Mobile device may also include client applications and other code that may be monitored by agent 719. Agent 719 may reside in and/or communicate with network browser 717, as well as communicate with other applications, an operating system, APIs and other hardware and software on mobile device 715. Agent 719 may have similar functionality as that described herein for agent 712 on client 705, and may repot data to data collection server 760 and/or controller 790.

Device 713 may be implemented as a network device that communicates with other devices over network 720. Device 713 may be communicatively coupled to network 720 via a wireless network, such as for example a WiFi network. Device 710 may also communicate with devices wirelessly via radio frequency networks, such as for example via a BLUETOOTH communication protocol. Device 710 may include one or more applications and one or more agents 711. Agent 711 may be executed to monitor a device application, operating system, resources such as processor, memory, and power usage, network latency and bandwidth, sensors and inputs, API, or another component of device 713. Agent 712 may monitor code, generate performance data from the monitored code, and transmit data to data collection 760, controller 790, or another device. Agent 712 may perform other operations related to monitoring a request or a network at device 713 as discussed herein including report generating.

Network 720 may facilitate communication of data among different servers, devices and machines of system 700 (some connections shown with lines to network 720, some not shown). The network may be implemented as a private network, public network, intranet, the Internet, a cellular network, Wi-Fi network, VoIP network, or a combination of one or more of these networks. The network 720 may include one or more machines such as load balance machines and other machines.

Network server 725 is connected to network 720 and may receive and process requests received over network 720. Network server 725 may be implemented as one or more servers implementing a network service, and may be implemented on the same machine as application server 730 or one or more separate machines. When network 720 is the Internet, network server 725 may be implemented as a web server.

Application server 730 communicates with network server 725, application servers 740 and 750, and controller 790. Application server 750 may also communicate with other machines and devices (not illustrated in FIG. 7). Application server 730 may host an application or portions of a distributed application. The host application 732 may be in one of many platforms, such as including a Java, PHP, .Net, and Node.JS, be implemented as a Java virtual machine, or include some other host type. Application server 730 may also include one or more agents 734 (i.e. "modules"), including a language agent, machine agent, and network agent, and other software modules. Application server 730 may be implemented as one server or multiple servers as illustrated in FIG. 7.

Application 732 and other software on application server 730 may be instrumented using byte code insertion, or byte code instrumentation (BCI), to modify the object code of the application or other software. The instrumented object code may include code used to detect calls received by application 732, calls sent by application 732, and communicate with agent 734 during execution of the application. BCI may also be used to monitor one or more sockets of the application and/or application server in order to monitor the socket and capture packets coming over the socket.

In some embodiments, server 730 may include applications and/or code other than a virtual machine. For example, servers 730, 740, 750, and 760 may each include Java code, .Net code, PHP code, Ruby code, C code, C++ or other binary code to implement applications and process requests received from a remote source. References to a virtual machine with respect to an application server are intended to be for exemplary purposes only.

Agents 734 on application server 730 may be installed, downloaded, embedded, or otherwise provided on application server 730. For example, agents 734 may be provided in server 730 by instrumentation of object code, downloading the agents to the server, or in some other manner. Agent 734 may be executed to monitor application server 730, monitor code running in a virtual machine 732 (or other program language, such as a PHP, .Net, or C program), machine resources, network layer data, and communicate with byte instrumented code on application server 730 and one or more applications on application server 730.

Each of agents 734, 744, 754 and 764 may include one or more agents, such as language agents, machine agents, and network agents. A language agent may be a type of agent that is suitable to run on a particular host. Examples of language agents include a JAVA agent, .Net agent, PHP agent, and other agents. The machine agent may collect data from a particular machine on which it is installed. A network agent may capture network information, such as data collected from a socket.

Agent 734 may detect operations such as receiving calls and sending requests by application server 730, resource usage, and incoming packets. Agent 734 may receive data, process the data, for example by aggregating data into metrics, and transmit the data and/or metrics to controller 790. Agent 734 may perform other operations related to monitoring applications and application server 730 as discussed herein. For example, agent 734 may identify other applications, share business transaction data, aggregate detected runtime data, and other operations.

An agent may operate to monitor a node, tier or nodes or other entity. A node may be a software program or a hardware component (e.g., memory, processor, and so on). A tier of nodes may include a plurality of nodes which may process a similar business transaction, may be located on the same server, may be associated with each other in some other way, or may not be associated with each other.

A language agent may be an agent suitable to instrument or modify, collect data from, and reside on a host. The host may be a Java, PHP, .Net, Node.JS, or other type of platform. Language agent may collect flow data as well as data associated with the execution of a particular application. The language agent may instrument the lowest level of the application to gather the flow data. The flow data may indicate which tier is communicating with which tier and on which port. In some instances, the flow data collected from the language agent includes a source IP, a source port, a destination IP, and a destination port. The language agent may report the application data and call chain data to a controller. The language agent may report the collected flow data associated with a particular application to a network agent.

A network agent may be a standalone agent that resides on the host and collects network flow group data. The network flow group data may include a source IP, destination port, destination IP, and protocol information for network flow received by an application on which network agent is installed. The network agent may collect data by intercepting and performing packet capture on packets coming in from a one or more sockets. The network agent may receive flow data from a language agent that is associated with applications to be monitored. For flows in the flow group data that match flow data provided by the language agent, the network agent rolls up the flow data to determine metrics such as TCP throughput, TCP loss, latency and bandwidth. The network agent may then report the metrics, flow group data, and call chain data to a controller. The network agent may also make system calls at an application server to determine system information, such as for example a host status check, a network status check, socket status, and other information.

A machine agent may reside on the host and collect information regarding the machine which implements the host. A machine agent may collect and generate metrics from information such as processor usage, memory usage, and other hardware information.

Each of the language agent, network agent, and machine agent may report data to the controller. Controller 790 may be implemented as a remote server that communicates with agents located on one or more servers or machines. The controller may receive metrics, call chain data and other data, correlate the received data as part of a distributed transaction, and report the correlated data in the context of a distributed application implemented by one or more monitored applications and occurring over one or more monitored networks. The controller may provide reports, one or more user interfaces, and other information for a user.

Agent 734 may create a request identifier for a request received by server 730 (for example, a request received by a client 705 or 715 associated with a user or another source). The request identifier may be sent to client 705 or mobile device 715, whichever device sent the request. In embodiments, the request identifier may be created when a data is collected and analyzed for a particular business transaction.

Each of application servers 740, 750 and 760 may include an application and agents. Each application may run on the corresponding application server. Each of applications 742, 752 and 762 on application servers 740-560 may operate similarly to application 732 and perform at least a portion of a distributed business transaction. Agents 744, 754 and 764 may monitor applications 742-562, collect and process data at runtime, and communicate with controller 790. The applications 732, 742, 752 and 762 may communicate with each other as part of performing a distributed transaction. In particular, each application may call any application or method of another virtual machine.

Asynchronous network machine 770 may engage in asynchronous communications with one or more application servers, such as application server 750 and 760. For example, application server 750 may transmit several calls or messages to an asynchronous network machine. Rather than communicate back to application server 750, the asynchronous network machine may process the messages and eventually provide a response, such as a processed message, to application server 760. Because there is no return message from the asynchronous network machine to application server 750, the communications among them are asynchronous.

Data stores 780 and 785 may each be accessed by application servers such as application server 750. Data store 785 may also be accessed by application server 750. Each of data stores 780 and 785 may store data, process data, and return queries received from an application server. Each of data stores 780 and 785 may or may not include an agent.

Controller 790 may control and manage monitoring of business transactions distributed over application servers 730-560. In some embodiments, controller 790 may receive application data, including data associated with monitoring client requests at client 705 and mobile device 715, from data collection server 760. In some embodiments, controller 790 may receive application monitoring data and network data from each of agents 712, 719, 734, 744 and 754. Controller 790 may associate portions of business transaction data, communicate with agents to configure collection of data, and provide performance data and reporting through an interface. The interface may be viewed as a web-based interface viewable by client device 792, which may be a mobile device, client device, or any other platform for viewing an interface provided by controller 790. In some embodiments, a client device 792 may directly communicate with controller 790 to view an interface for monitoring data.

Client device 792 may include any computing device, including a mobile device or a client computer such as a desktop, work station or other computing device. Client computer 792 may communicate with controller 790 to create and view a custom interface. In some embodiments, controller 790 provides an interface for creating and viewing the custom interface as a content page, e.g., a web page, which may be provided to and rendered through a network browser application on client device 792.

Applications 732, 742, 752 and 762 may be any of several types of applications. Examples of applications that may implement applications 732-562 include a Java, PHP, .Net, Node.JS, and other applications.

Figure 8:
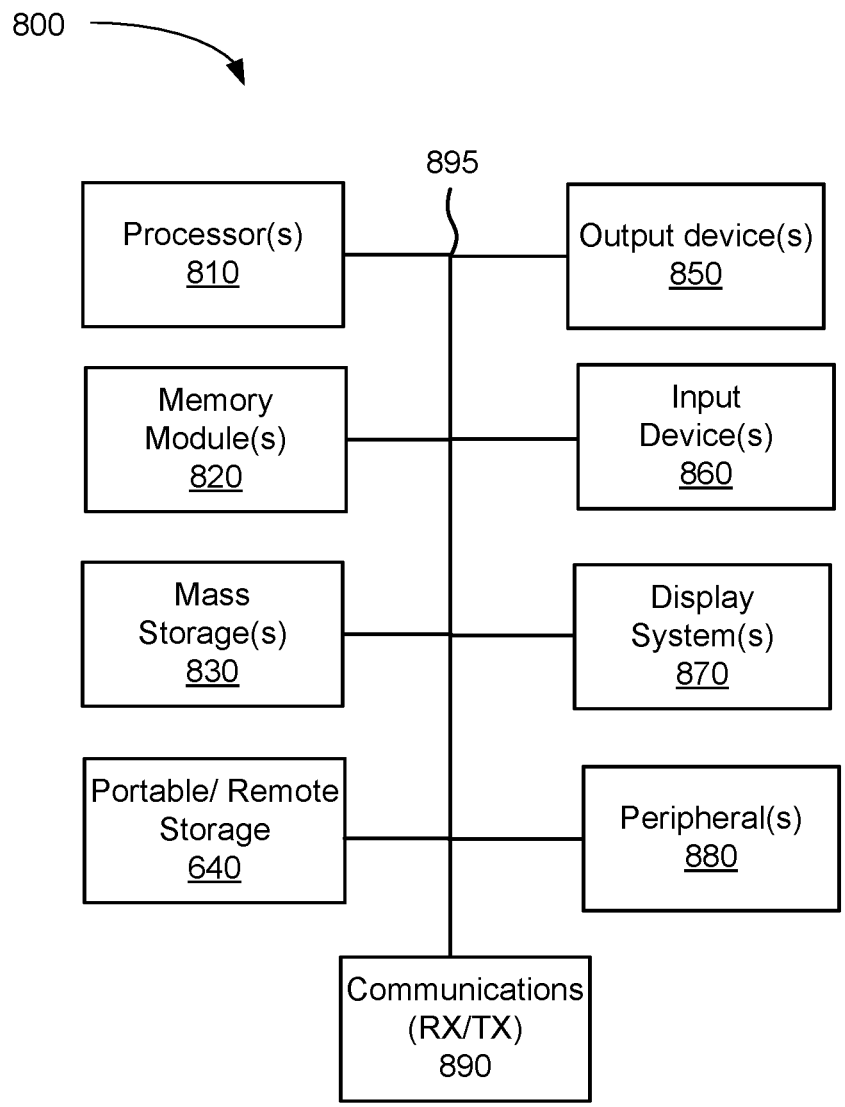
FIG. 8 is a block diagram of an exemplary computing system implementing the disclosed technology.

FIG. 8 is a block diagram of a computer system 800 for implementing the present technology. System 800 of FIG. 8 may be implemented in the contexts of the likes of clients 805, 892, network server 825, servers 830, 840, 850, 860, a synchronous network machine 870 and controller 890.

The computing system 800 of FIG. 8 includes one or more processors 810 and memory 820. Main memory 820 stores, in part, instructions and data for execution by processor 810. Main memory 810 can store the executable code when in operation. The system 800 of FIG. 8 further includes a mass storage device 830, portable storage medium drive(s) 840, output devices 850, user input devices 860, a graphics display 870, and peripheral devices 880.

The components shown in FIG. 8 are depicted as being connected via a single bus 890. However, the components may be connected through one or more data transport means. For example, processor unit 810 and main memory 820 may be connected via a local microprocessor bus, and the mass storage device 830, peripheral device(s) 880, portable or remote storage device 840, and display system 870 may be connected via one or more input/output (I/O) buses.

Mass storage device 830, which may be implemented with a magnetic disk drive or an optical disk drive, is a non-volatile storage device for storing data and instructions for use by processor unit 810. Mass storage device 830 can store the system software for implementing embodiments of the present invention for purposes of loading that software into main memory 820.

Portable storage device 840 operates in conjunction with a portable non-volatile storage medium, such as a compact disk, digital video disk, magnetic disk, flash storage, etc. to input and output data and code to and from the computer system 800 of FIG. 8. The system software for implementing embodiments of the present invention may be stored on such a portable medium and input to the computer system 800 via the portable storage device 840.

Input devices 860 provide a portion of a user interface. Input devices 860 may include an alpha-numeric keypad, such as a keyboard, for inputting alpha-numeric and other information, or a pointing device, such as a mouse, a trackball, stylus, or cursor direction keys. Additionally, the system 800 as shown in FIG. 8 includes output devices 850. Examples of suitable output devices include speakers, printers, network interfaces, and monitors.

Display system 870 may include a liquid crystal display (LCD) or other suitable display device. Display system 870 receives textual and graphical information, and processes the information for output to the display device.

Peripherals 880 may include any type of computer support device to add additional functionality to the computer system. For example, peripheral device(s) 880 may include a modem or a router.

The components contained in the computer system 800 of FIG. 8 can include a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Apple OS, and other suitable operating systems, including mobile versions.

When implementing a mobile device such as smart phone or tablet computer, the computer system 800 of FIG. 8 may include one or more antennas, radios, and other circuitry for communicating over wireless signals, such as for example communication using Wi-Fi, cellular, or other wireless signals.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A system using a network device for automatic application repair by a network device agent operating on the network device in a monitored environment, the network device including:
   a processor;
   a memory; and
      one or more modules stored in the memory and executable by a processor to perform operations including:
      capture network device application data for a monitored application, the network device performing a function other than computing;
      analyze the captured network device application data to detect a performance issue associated with the monitored application;
      identify a temporary remedy for the performance issue that enables the network device to continue to operate in a limited capacity, the temporary remedy automatically determined by a model using training data that corresponds to the captured network device application data; and
      automatically apply the temporary remedy to the network device.

2. The system of claim 1, wherein the captured network device application data includes captured input data and captured output data.

3. The system of claim 1, wherein the analyzing the captured network device application data to detect the performance issue includes:
   analyzing application data to determine an application performance anomaly; and
   analyzing network device functionality to determine a functional performance anomaly.

4. The system of claim 1, wherein the identifying the temporary remedy includes retrieving and comparing the training data with the captured network device application data.

5. The system of claim 1, wherein the identifying the temporary remedy includes selecting a remedy to apply to the network data based on the comparing of the training data with the captured network device application data.

6. The system of claim 1, wherein automatically applying the temporary remedy to the network device includes disabling a portion of the network device functionality.

7. The system of claim 1, wherein automatically applying the temporary remedy to the network device includes transmitting a suggested remedy to an administrator.

8. The system of claim 1, wherein the one or more modules stored in the memory are executable by a processor to perform operations including:
   adding the captured network device application data and the automatically applied temporary remedy to the training data for the network device.

9. The system of claim 1, wherein the network device includes one of a smart appliance, parking meter, point of sale device, and a home automation gateway device.

10. A method for automatic application repair by a network device agent operating on a network device in a monitored environment, the method comprising:
   capturing, by the network device agent on the network device, network device application data for a monitored application, the network device performing a function other than computing;

detecting, by the network device agent, an anomaly associated with the monitored application based on the captured net device application data;

in response to detecting the anomaly, identifying, by the network device agent, a temporary remedy for the anomaly that enables the network device to continue to operate in a limited capacity, the temporary remedy automatically determined by a model using with training data that corresponds to the captured network device application data; and automatically applying, by the network device agent, the temporary remedy to the network device.

11. The method of claim 10, wherein the captured network device application data includes captured input data and captured output data.

12. The method of claim 10, wherein detecting the anomaly comprises:

analyzing application data to determine an application performance anomaly; and analyzing network device functionality to determine a functional performance anomaly.

13. The method of claim 10, wherein identifying the temporary remedy includes retrieving and comparing the training data with the captured network device application data.

14. The method of claim 10, wherein identifying the temporary remedy includes selecting a remedy to apply to the network device application data based on the comparing of the training data with the captured network device application data.

15. The method of claim 10, wherein automatically applying the temporary remedy to the network device includes disabling a portion of the network device functionality.

16. The method of claim 10, wherein automatically applying the temporary remedy to the network device includes transmitting a suggested remedy to an administrator.

17. The method of claim 10, further comprising:

adding the captured network device application data and the automatically applied temporary remedy to the training data for the network device.

18. The method of claim 10, wherein the network device includes one of a smart appliance, parking meter, point of sale device, and a home automation gateway device.

19. A non-transitory computer readable medium embodying instructions when executed by a processor to cause operations to be performed for automatic application repair by a network device agent operating on a network device in a monitored environment, the operations comprising:

capturing network device application data for a monitored application by the network device agent on the network device, the network device performing a function other than computing;

detecting an anomaly associated with the monitored application based on the captured network device application data;

in response to detecting the anomaly, identifying a temporary remedy for the anomaly that enables the network device to continue to operate in a limited capacity, the temporary remedy automatically determined by a model using training data that corresponds to the captured network device application data; and automatically applying the temporary remedy to the network device, analyzing application data to determine an application performance anomaly; and analyzing network device functionality to determine a functional performance anomaly.

20. The non-transitory computer readable medium of claim 19, wherein the captured network device application data includes captured input data and captured output data.

21. The non-transitory computer readable medium of claim 19, wherein detecting the anomaly comprises:

analyzing application data to determine an application performance anomaly; and analyzing network device functionality to determine a functional performance anomaly.

22. The non-transitory computer readable medium of claim 19, wherein identifying the temporary remedy includes retrieving and comparing the training data with the captured network device application data.

23. The non-transitory computer readable medium of claim 19, wherein identifying the temporary remedy includes selecting a remedy to apply to the network device application data based on the comparing of the training data with the captured network device application data.

24. The non-transitory computer readable medium of claim 19, wherein automatically applying the temporary remedy to the network device includes disabling a portion of the network device functionality.

25. The non-transitory computer readable medium of claim 19, wherein automatically applying the temporary remedy to the network device includes transmitting a suggested remedy to an administrator.

26. The non-transitory computer readable medium of claim 19, further comprising adding the captured network device application data and the automatically applied temporary remedy to the training data for the network device.

27. The non-transitory computer readable medium of claim 19, wherein the network device includes one of a smart appliance, parking meter, point of sale device, and a home automation gateway device.

* * * * *

UNITED STATES PATENT AND TRADEMARK OFFICE
CERTIFICATE OF CORRECTION

PATENT NO. : 10,459,780 B2
APPLICATION NO. : 15/582665
DATED : October 29, 2019
INVENTOR(S) : Srinivas Pasupuleti et al.

Page 1 of 1

It is certified that error appears in the above-identified patent and that said Letters Patent is hereby corrected as shown below:

In the Claims

Column 19, Line 3 delete "net" and insert --network--

Column 20, delete Lines 12-15

Signed and Sealed this
Twenty-first Day of January, 2020

Andrei Iancu
*Director of the United States Patent and Trademark Office*